Feb. 22, 1966 F. B. BOSCAMP 3,236,404
RECEPTACLE WITH IMPROVED CORNER UNIT
Filed May 15, 1962 3 Sheets-Sheet 1
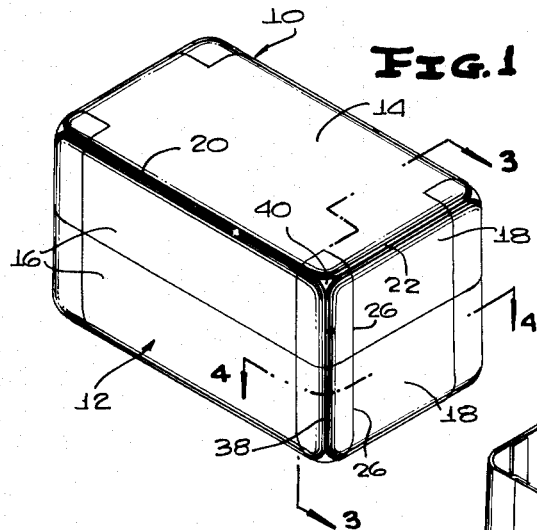
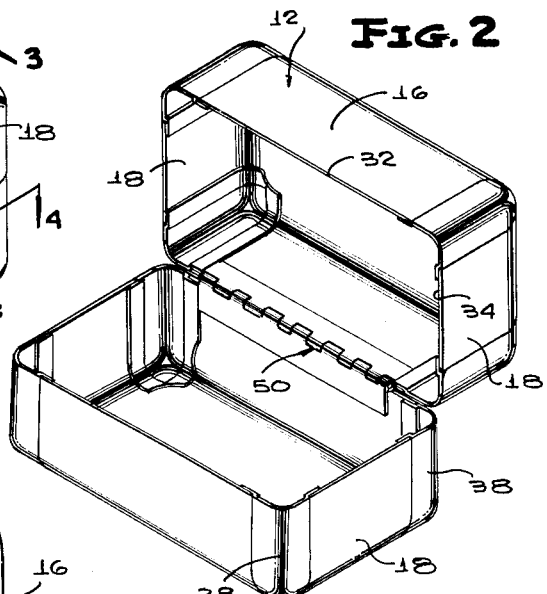
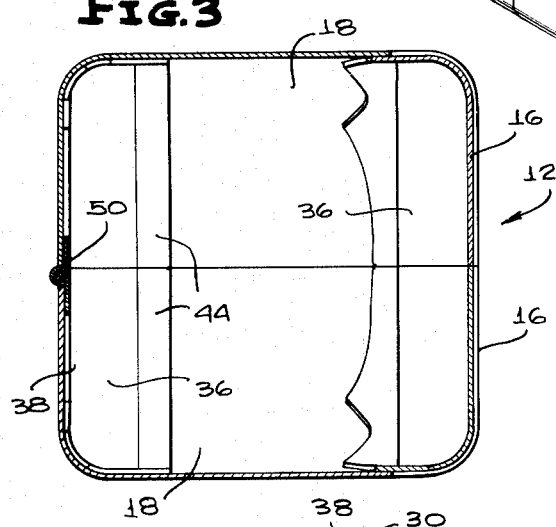
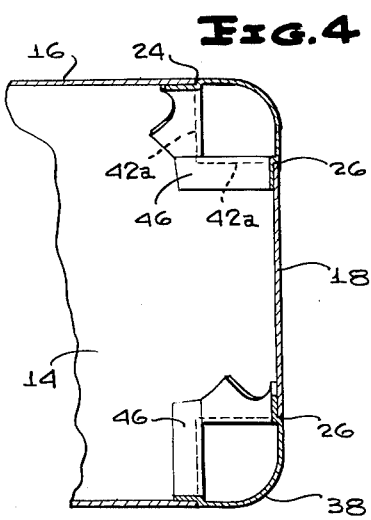
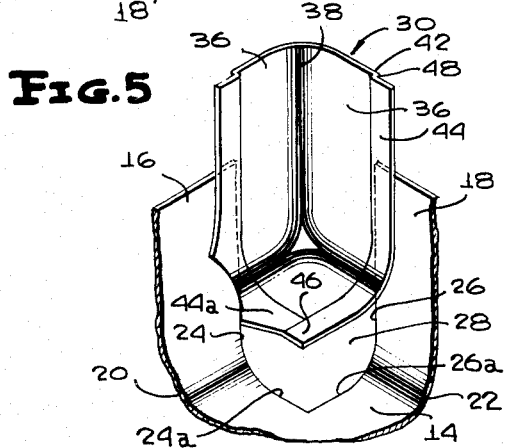
INVENTOR
FRANCIS B. BOSCAMP
BY Shoemaker and Mattare
ATTORNEYS

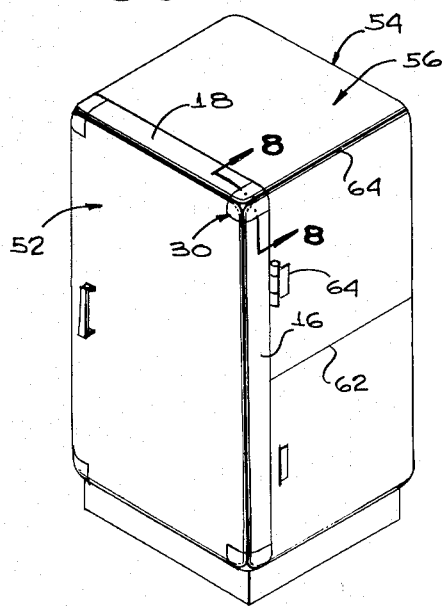
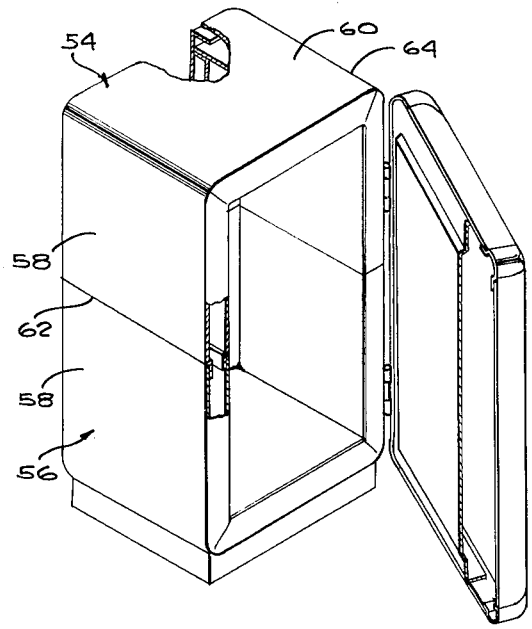
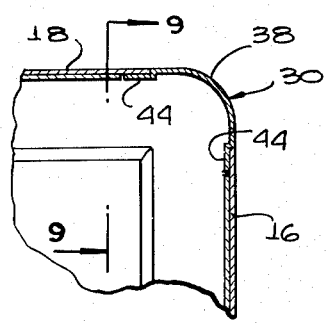
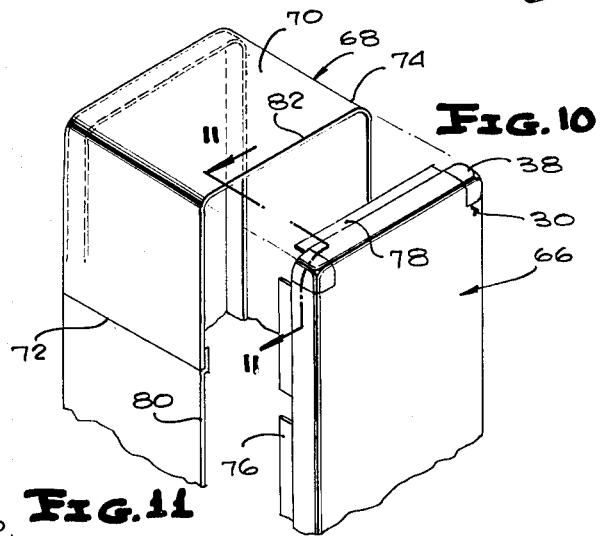
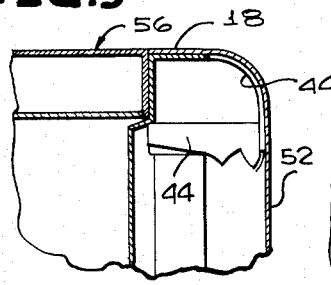
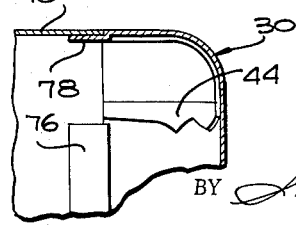

Feb. 22, 1966   F. B. BOSCAMP   3,236,404
RECEPTACLE WITH IMPROVED CORNER UNIT
Filed May 15, 1962   3 Sheets-Sheet 3
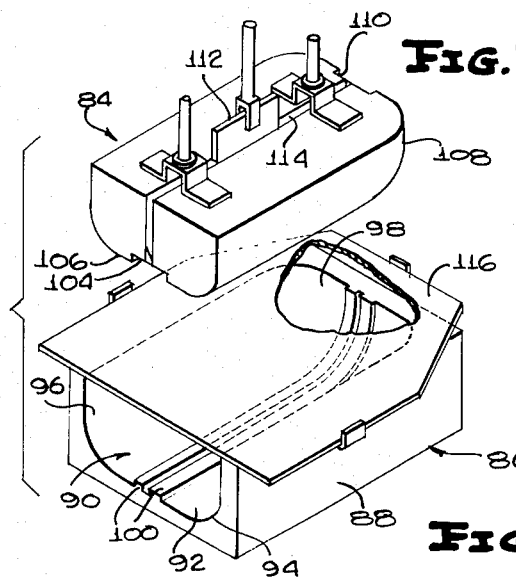
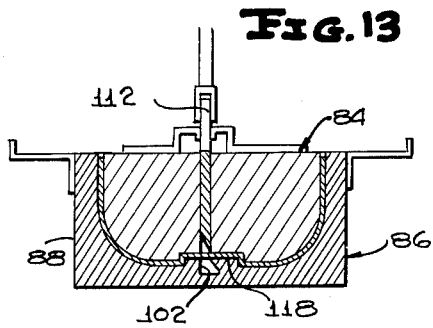
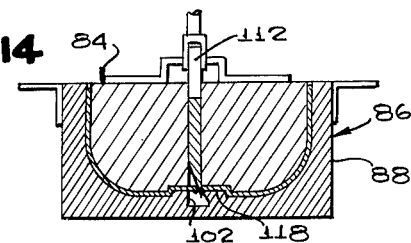
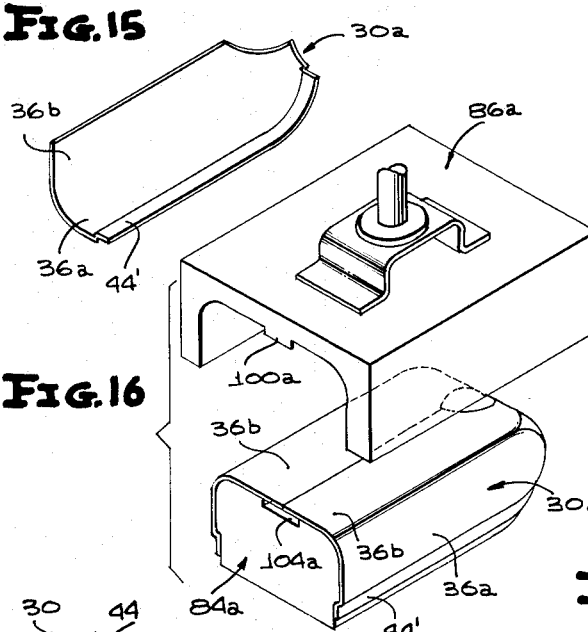
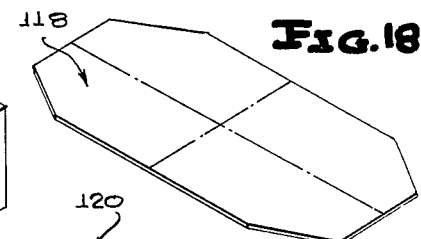
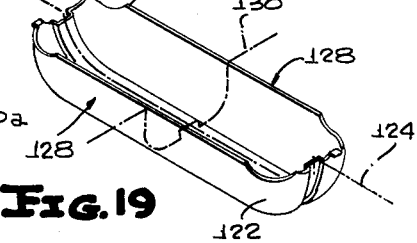
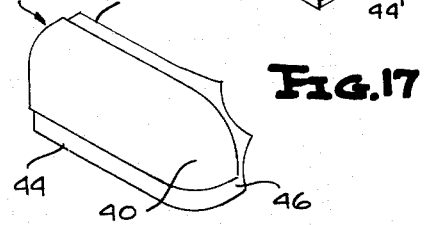
INVENTOR
FRANCIS B. BOSCAMP
BY Shoemaker and Mattare
ATTORNEYS United States Patent Office 3,236,404
Patented Feb. 22, 1966

3,236,404
RECEPTACLE WITH IMPROVED
CORNER UNIT
Francis B. Boscamp, Mount Vernon, N.Y., assignor of one-half to B. Richard Boscamp, Mount Vernon, N.Y.
Filed May 15, 1962, Ser. No. 194,816
1 Claim. (Cl. 220—4)

This invention relates generally to improvement in receptacles and similar hollow bodies formed of sheet material, and a method of forming structural units thereof.

In the following description of the invention reference will be made to the invention as being directed to the construction of a receptacle, but since the invention is applicable to many different forms of hollow structures formed of sheet material, such as sheet metal, for example, it is to be understood that the term "receptacle" is used in a generic sense and is not in any way intended to limit the invention to boxes, containers, or other such structures which might be grouped under the heading "receptacles" but is applicable to any and all types of hollow structures which may be made from sheet metal or other sheet material.

A particular object of the present invention is to provide a new and attractive receptacle construction having neatly and artistically rounded edges and corners wherein certain edges and corners are formed by separately fabricated structural units which combine with and are joined to wall parts of the receptacle in a novel manner to form a neat and completely tight seam.

Another object of the invention is to provide a new receptacle structure which can be formed in practically any depth to have neatly and widely rounded edges and corners and wherein the major portion of the body may be shaped from a single sheet of material with certain edges and corners of the body being formed as separate inserts which are joined in a novel manner to the main body portion to form a complete shell.

Still another object of the invention is to provide a receptacle body or shell of the character stated wherein the structural units forming the said corner inserts are formed in a novel manner with attaching edge flanges which converge and join at a rounded corner of the unit in such a manner that when the unit is joined by such flanges to and between converging edges of a side wall of the receptacle, a completely closed and tight seam is affected.

Another object of the invention is to provide a novel method of forming by stamping from sheet metal or other suitable sheet material, a corner structural unit of quarter-round cross section with an octa-spherical end form, either on one end or both ends and with longitudinal edge flanges which continue around the convergent edges of the octa-spherical end and merge at and extend across such apex.

The invention will be best understood from a consideration of the following detailed description taken in connection with the accompanying drawings wherein:

FIG. 1 is a view in perspective of a receptacle in the form of a box, the halves of which are hingedly connected together and showing corners and edges thereof constructed in accordance with the present invention.

FIG. 2 is a view in perspective of the box shown in FIG. 1 and showing the halves thereof separated for a view of the interior of each half.

FIG. 3 is a transverse section on an enlarged scale, taken substantially on the line 3—3 of FIG. 1.

FIG. 4 is a partial horizontal section, on an enlarged scale taken substantially on the line 4—4 of FIG. 1.

FIG. 5 is a fragmentary detail illustrating a corner structural unit in partially assembled relationship with adjacent edges of two convergent walls.

FIG. 6 illustrates one application of the present invention to a hollow shell structure having corners constructed in accordance with the present invention, in assembled relationship with a hollow sheet metal body, such, for example, as the body of a refrigerator structure, formed from a single elongate sheet, or from a pair of elongate sheets of material and having rounded top and bottom side corners.

FIG. 7 is a view corresponding to FIG. 6, but having parts broken away to show details of construction and showing the shell front or cover portion of the structure, constructed in accordance with the present invention, swung out away from the body of the structure.

FIG. 8 is a sectional detail, the line of section being 8—8 on FIG. 6.

FIG. 9 is a sectional detail, the line of section being designated 9—9 on FIG. 8.

FIG. 10 is a partial section of a cover shell illustrating the manner in which same may be used as a slip-on cover for a box or container, the body portion of such a box or container being more-or-less diagrammatically illustrated with the bottom portion broken away.

FIG. 11 is a detailed section taken approximately on the line 11—11 of FIG. 10, of the cover shell but showing a portion of the housing body joined thereto.

FIG. 12 illustrates diagrammatically a first stage in the method of forming in one operation a pair of the structural units.

FIG. 13 is a diagrammatic cross section of the forming dies and the structural units showing the second stage in the operation or method of forming the units.

FIG. 14 illustrates the third stage where the formed sheet is slit longitudinally to provide the two parts or two units.

FIG. 15 is a view in perspective of one of the two incompletely formed structural units obtained at the completion of the third stage of the method, the illustration showing the inner side of the unit and showing the completion of only one attaching flange.

FIG. 16 illustrates diagrammatically the performance of the fourth stage of the method for the formation of the second flange on each of two units.

FIG. 17 is a view in perspective of a completed structural unit, viewing the outer side thereof and showing the manner in which the two flanges join and extend beyond the apex of the octa-spherical corner portion of the unit.

FIG. 18 is a view in perspective of a starting sheet of material for the die forming in one operation of a doubly terminated two-part stamping designed to be cut transversely for the formation of four complete structural units.

FIG. 19 is a view in perspective of the completed stamping before being cut transversely for formation of four complete structural units.

Referring now more particularly to the drawings the description of the invention will first be directed to the receptacle of a box form as illustrated in FIGS. 1 to 5.

In the figures referred to, the box-like receptacle is generally designated 10 and is illustrated as comprising two shell parts or sections, each of which is generally designated 12, and in the illustration of the structure the shells or shell sections are shown as being of the same depth. However, it is to be understood that they may be of any desired depth, as, for example, one shell may be relatively deep and the other one may be comparatively shallow to form a shallow top or lid. It will accordingly be understood that the invention is not in any way limited as to the length, depth, width or any form of the shell, since the invention is directed primarily to a novel edge and corner construction, as hereinafter more specifically described.

Since the shell sections or plate elements 12 shown in FIGS. 1 to 5 are of duplicate form, the description of one will obviously apply to the other and therefore the following description will be directed to one shelf only.

The shell section comprises a sheet of metal which may be cold rolled steel, stainless steel or aluminum, or any other desired material suitable for forming the desired receptacle and such sheet of material is shaped by bending in a suitable die or in any other suitable manner to form the large wall part 14, the parallel side walls 16, perpendicular to the wall part 14 and which may be defined, for clarity of description, as longitudinal walls, and the parallel walls 18 which are also perpendicular to the large wall 14 and which may be defined, for clarity of description, as the end walls.

The longitudinal side walls and the end walls are joined to the large area wall part which may be defined as the top or front wall or it may constitute a bottom wall for the box, but for convenience of description, will be referred to as the top wall, by the relatively widely rounded longitudinal side edges 20 and transverse end edges 22.

The side walls and the end walls have transverse end edges designated respectively 24 and 26 which are in spaced parallel relation and between which a corner opening is formed to be closed by the hereinafter described corner forming structural unit.

These corner forming structural units are generally designated 30.

As is clearly shown, particularly in FIG. 5, the transverse end edges 24 and 26 of the side walls 16 and 18 respectively, extend across the adjacent rounded edges of the structure and into the top or large wall part 14.

The portion of the edge 26 extending into the top 14 is designated 26a and the portion of the edge 24 extending into the top 14 is designated 24a and these extended edge portions intersect to form a 90° angle.

Each corner opening 28 is closed by a structural unit 30 as is best illustrated in FIGS. 2, 4, and 5, so as to form a completely rounded edge extending perpendicular to the top 14 which flows into a rounded corner and which rounded corner merges with or flows into the adjacent rounded edges 20 and 22 to form the smoothly rounded finished edges and corners of the box.

The rounded edge provided by the structural unit 30 is here illustrated as constituting the vertical edge of the box.

Each corner forming structural unit 30 is made of desired length to conform to the depth of the shell of which it is made a part, and to terminate at its non-rounded end flush with the straight longitudinal edges 32 and 34 of the longitudinal and transverse walls 16 and 18 respectively.

The structural unit 30 embodies the longitudinal wings 36, which are of substantial or necessary width and which are joined together by the relatively widely rounded longitudinal edge 38. The transverse curvature of this rounded edge 38 corresponds to the transverse curvatures of the rounded edges 20 and 22.

One end of the unit 30 terminates in a rounded or dome shaped corner 40 which may be defined as being substantially octa-spherical in that it susbtantially defines the eighth part of a sphere. The wing portions 36 extend into the rounded corner and the longitudinal edges 42 of the wings 36 extend into the rounded octa-spherical corner 40, forming the short intersecting edges 42a which define the 90° angle to conform to the angle defined by the intersecting edges 24a and 26a in the main body portion of the shell.

Each of the wings 36 is bordered along its edge 42 by the inset flange 44 and these flanges continue along the intersecting edges 42a as indicated at 44a and the flanges or flange portions 44a join to form the corner projection 46 which extends radially inwardly from the point of intersection of the edges 42a.

It will accordingly be seen from the foregoing that the inset flanges 44 and the angular extensions 44a thereof provide shoulders 48 entirely along the edges of the wings 36 to the point of intersection of the edge extension portions 42a.

The end of the structural unit 30 opposite from the rounded corner 40 is cut straight or square across so as to lie flush with or in the plane of the edges 32 and 34 when the corner unit is fixed in the opening 28.

It will be readily seen upon reference to FIG. 5 that when the corner unit 30 is properly dimensioned with respect to the opening 28 that it may be set into the opening 28 with the flanges 44 and extending portions 44a positioned against the inner surfaces of the adjacent convergent walls 16 and 18 and the edges 24 and 26 of the walls together with the extended portions 24a and 26a will position tightly against the shoulders 42. Also it will be apparent that the corner projection 46 formed by the joining of the flange extensions 44a will extend inwardly from the corner formed by the intersecting edges 24a and 26a of the opening 28, to lie against the underside of the top 14 and thus there will be a tight joint formed which may be made completely watertight by securements such as brazing, soldering, etc., between the edges of the walls 16 and 18 and the inserted structural unit 30.

The structural unit may be secured in position in any suitable manner as by welding, brazing, spot welding or soldering.

In the box-like structure illustrated in FIGS. 1 to 5, the shell parts or sections 12 have been illustrated as being hingedly connected along adjacent longitudinal edges of walls 16, the hinge connection here being generally designated 50 and being of the well-known piano hinge type. However it will be readily obvious that the two shell sections may be joined in any other suitable manner.

It is also contemplated to embody the present invention on a shell section of the character described, which may be of relatively shallow depth, and attached to another type of shell or body having rounded horizontal corners but not embodying therein structural units such as the unit 13. Such type of housing may form a body for a structure such as a refrigerator wherein the back would be perfectly flat and wherein no rounded rear or back corners would be desired.

FIGS. 7 to 9 illustrate such another application of a shell section having the rounded corner inserts 30 and made of shallow depth to function as a door.

In these FIGURES 6 to 9, the door shell constructed in accordance with the present invention, is generally designated 52, while the body of the box or housing to which it is joined and which may constitute the body of a refrigerator or any other structure, is generally designated 54.

The housing 54 has been here illustrated as an upright shell and may be formed of two elongate sheets of material, each of which is designated 56, bent to have side wall portions 58 and end wall portions 60, one only of which end walls 60 is illustrated.

The transverse edges of the sheets may be joined together as at 62 forming the seams across the opposite sides of the structure 54 and the top and bottom side corners of the housing structure 54, which are here designated as 64, may be rounded to conform or agree in curvature with the curvature of the rounded edge 38 of the structural unit 30 which forms a part of the door forming shell 52.

Since the door forming shell would be constructed in the same manner as the hereinbefore described shells 12, with the single exception that the side and end walls would be of less height so that the door shell 52 would be shallower, no further detailed description of the shell 52 will be given as it will be readily apparent that the description given for the unit 30 and the shell sections 12 will apply. Accordingly the same reference numerals will be employed for the parts of FIGS. 6 to 9 which correspond to parts illustrated in FIGS. 1 to 5.

In place of making the body structure 54 in two sections of substantially U-form and joined together at two horizontal meeting edges 62 as shown, it is also contemplated to make the housing body 54 of a single strip of sheet metal bent into the rectangular form shown, whereby there will be only two horizontal meeting edges.

FIG. 7 illustrates one way in which the meeting edges of the side walls 58 may be overlapped to form a strong join, this overlapped connection or joint being generally designated 62.

While the structure 54 has been generally designated as a refrigerator body, obviously it may be made of single wall construction, rather than a double wall construction as illustrated, for use as a cabinet, either of a large size to stand on the floor, or a smaller size, for general storage purposes.

It is also contemplated to make the front or cover shell so that it may be used as a slip-on cover instead of being hingedly attached to the body as the shell 52 is shown at 64, attached to the body 54.

FIGS. 9 and 10 illustrate more-or-less diagrammatically a construction for the shallow door forming shell generally designated 66, which can be slip-coupled with a correspondingly shaped housing or shell body such as that generally designated 68.

The housing shell 68 is here illustrated as embodying a single long sheet of material 70 having only two end edges which may be brought together at one side of the structure to form the transverse or front-to-rear joint 72. It will be understood that in this structure the top and bottom horizontal corners 74 will be transversely rounded to conform to the curve of the corners 38 of the ends of the units 30 abutting thereagainst.

In the construction shown in FIGS. 10 and 11 the shell forming cover 68 is constructed in a similar manner to the shell 52 and the shells 12 with the exception that the longitudinal side walls and the transverse end walls are modified in the following manner.

The longitudinal side walls, one only of which is illustrated, and the transverse end walls, one only of which is illustrated, are provided with inset parallel flanges 76 and 78 respectively. These flanges terminate short of the inserted corner structural units 30 and they are designed to enter the open front side of the housing shell 68 so that the edges of the side and end walls will abut the longitudinal and transverse edges 80 and 82 when the cover or lid 66 is applied.

FIGS. 12 to 17 illustrate diagrammatically the novel method employed for forming the structural units 30.

In following out the method there are provided male and female dies 84 and 86 respectively as shown in perspective in FIG. 12.

The female die is here shown as comprising the body 88 having the elongate chamber 90 therein. This chamber has the wide longitudinally extending floor portion 92 which, at each side, curves upwardly as at 94 into the vertical side walls 96. The chamber at one end is open while at the opposite or inner end the floor curves upwardly as at 98 and is rounded where the floor, the side wall 96 and the wall 98 merge to form the rounded or domed end of the insert unit, on the outer side.

Running lengthwise of the floor portion 92 of the die chamber are the two spaced parallel ribs 100 thus providing a division channel 102 for the purpose hereinafter set forth.

The male die 84 is provided with a wide longitudinal channel 104 in its bottom surface 106 into which the spaced ribs 100 may enter when the dies are brought together and it will be understood that this channel 104 extends upwardly across the rounded forward end face 108 of the die 84, as indicated at 110.

This forming die comprises a two-stage power press having double action in this it is designed to bring the male and female dies into cooperative relation to shape a sheet of metal to desired form and to then split the shaped sheet by means of a knife or blade 112 which moves in the slot 114 and in the performance of its cutting or shearing operation enters the groove or channel 102 in the female die 86.

In carrying out the method for the formation of two of the structural units 30 a sheet of the selected metal, such as that indicated at 116, it is placed in position over the forming chamber 90 in a manner illustrated in FIG. 12, and the forming die 84 is lowered to force the metal of the sheet 116 downwardly into the chamber.

In this first stage of the method the sheet 116 is pressed into the form shown in cross-section in FIG. 13 where the sheet is given a substantially U-shaped cross-section with a central wide upstanding rib 118 lying across the channel 102 and extending or curving upwardly at the inner end of the forming chamber. Upon the completion of this second stage, the third stage of the method is carried out which consists in the downward projection of the knife 112 whereby to slit the formed sheet lengthwise. This slitting action of the knife is illustrated in FIG. 14.

At the completion of the third stage there are then obtained two incomplete structural units of the form illustrated in FIG. 15. This incomplete structural unit is here generally designated 30a and as shown it has one side wing 36a along the edge of which extends the flange 44'.

The opposite wing 36b is here straight and unflanged as shown.

The next step in the method of forming the pair of structural units consists in taking two of the incompletely formed units 32a and placing them with the inner sides down upon a male die 84a, with the longitudinal edges of the unflanged wing portions 36b in edge-to-edge relation over the longitudinal channel 104a.

A female die 86a, corresponding to the die 86 and having a single longitudinal rib 100 running lengthwise of the inner floor surface thereof, is then brought down over the male die 84a and the incompleted units 30a thereon so effect the formation on each incomplete unit of a second flange with which operation the formation of the desired structural unit 30 is completed as shown in FIG. 17.

With the completion of the operation the two flanges 44 hereinbefore described, are obtained and which flanges cross at the point of the rounded or domed octa-spherical portion 40.

As will be readily apparent from the foregoing two corner forming structural units of the same length are readily produced by the method described. Also it will be apparent that where more than two units of the same length are desired for incorporation in a receptacle structure by starting with plates all of the same length for say four, six or more units, the units produced by the method described will all be of the same length and no cutting to size or trimming will be required.

The hereinbefore described method may be applied to a sheet of metal such as that illustrated in FIG. 18 and generally designated 118, for the production of two long twin units which may then be cut transversely at any desired location to obtain corner forming structural units of a desired size.

As shown the plate 118 has its opposite ends with the corners cut off and by employing a die structure of the proper length and in which both ends of the chamber of the female die body are rounded in a manner corresponding to the rounded ends 98 and in which the male die body also has opposite ends rounded in a manner corresponding to the ends 108 of the male die 84, there may be produced in one stamping operation, at the second stage of the method, illustrated in FIG. 13, the long centrally ribbed product having rounded ends such as that generally designated 120 wherein the two ends include the two rounded or octa-spherical portions 122, corresponding to the rounded corner or dome-shaped corner 40 of a completed single unit.

In the operation of the third stage of the method upon the product 120, illustrated in FIG. 19, it will be obvious that the product will be split or cut along the line 124, which line runs centrally along the rib 126 so that there will then be obtained the two halves 128. Each of these halves in effect constitutes two incomplete units corresponding to the one shown in FIG. 15, joined together at their squared off ends. The two long or twin units 128 may then be cut transversely at any location along the length thereof along the line 130 as illustrated. Accordingly by following out the method using the long sheet or plate of metal such as is indicated at 118, there may be obtained four complete corner forming structural units of the character illustrated in FIG. 17.

From the foregoing it will be seen that there is provided by the present invention a receptacle structure, which may be in the form of a box, casing, cabinet or any similar form, in which a novel corner and edge construction is provided which will give to the receptacle a nicely contoured and attractive appearance and in which such corner and edge construction is obtained by the use of a novel structural unit which, when fitted into position will coact with and join adjacent parts of the receptacle structure in a manner to form a clean tight joint.

There is also set forth a novel method of stamping or shaping the corner units. While it may be possible to form these units by other means than the specific method means herein set forth, this method means has been found to be the most rapid and economical manner of shaping or forming the structural units illustrated.

As this invention may be embodied in several forms without departing from the spirit or essential characteristics thereof, the present embodiment is thereof illustrative and not restrictive, since the scope of the invention is defined by the appended claim rather than by the description preceding them, and all changes that fall within the metes and bounds of the claims or that form their functional as well as conjointly cooperative equivalents, are therefore intended to be embraced by this claim.

I claim:

A receptacle component comprising a plate element having a flat base portion of rectangular configuration, four side portions integral with and extending outwardly from the edges of said base portion, each of said four side portions comprising opposite planar sections interconnected by an arcuate section of unicurved configuration and which turns through an arc of 90 degrees, one of said planar sections of each side portion lying in the same plane as the base portion, the other of said planar sections of each of said side portions being normal to the base portion and extending away from the same side of the base portion, four corner units, each unit positioned between two adjacent side portions, each corner unit comprising an octa-spherical section having the same radius of curvature as the arcuate sections of said side portions, each of said units further comprising a unicurved section integral with said octa-spherical section and constituting a tangential extension of said octa-spherical section and having a radius of curvature equal to the radius of curvature of the arcuate sections of said side portions and a flange extending around the free edges of said octa-spherical section and around those free edges of the unicurved section adjacent said octa-spherical portion and being offset by the thickness of said side portions and underlying the same, securement permanently and fixedly connecting the corner units through their flanges to those side portions adjacent thereto.

References Cited by the Examiner
UNITED STATES PATENTS

| | | | |
|---|---|---|---|
| 2,366,487 | 1/1945 | Burgess | 113—51 |
| 2,400,150 | 5/1946 | Jones | 220—80 |
| 2,526,335 | 10/1950 | Deichert | 220—4 |
| 2,656,064 | 10/1953 | Bues | 220—4 |
| 2,673,657 | 3/1954 | Bergh | 220—4 |
| 2,989,019 | 6/1961 | Vansciver | 113—51 |
| 3,025,995 | 3/1962 | Koelsch | 220—62 |

FOREIGN PATENTS

| | | |
|---|---|---|
| 14,272 | 1905 | Great Britain. |

THERON E. CONDON, *Primary Examiner.*